United States Patent
Han et al.

(10) Patent No.: US 11,767,453 B2
(45) Date of Patent: Sep. 26, 2023

(54) SILICONE-BASED ADHESIVE PROTECTIVE FILM AND OPTICAL MEMBER COMPRISING THE SAME

(71) Applicant: Samsung SDI Co., Ltd., Yongin-si (KR)

(72) Inventors: Dong Il Han, Suwon-si (KR); Tae Ji Kim, Suwon-si (KR); Won Kim, Suwon-si (KR); Il Jin Kim, Suwon-si (KR); Dong Myeong Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 758 days.

(21) Appl. No.: 16/727,769

(22) Filed: Dec. 26, 2019

(65) Prior Publication Data

US 2020/0208032 A1 Jul. 2, 2020

(30) Foreign Application Priority Data

Dec. 31, 2018 (KR) .................... 10-2018-0173918

(51) Int. Cl.
*C09J 183/06* (2006.01)
*C09J 7/40* (2018.01)
(Continued)

(52) U.S. Cl.
CPC ............. *C09J 183/06* (2013.01); *C09J 7/401* (2018.01); *C09J 11/06* (2013.01); *C09J 183/04* (2013.01);
(Continued)

(58) Field of Classification Search
CPC . C09J 183/04; C09J 183/06; C09J 7/00; C09J 7/30; C09J 7/401; C09J 11/06;
(Continued)

(56) References Cited

U.S. PATENT DOCUMENTS

2011/0097579 A1* 4/2011 Mizuno ................... C08L 83/00
428/355 R
2012/0202055 A1 8/2012 Kataoka et al.
(Continued)

FOREIGN PATENT DOCUMENTS

CN 101555353 A 10/2009
CN 101595192 A 12/2009
(Continued)

OTHER PUBLICATIONS

Taiwan Office Action for corresponding Taiwan Patent Application No. 108147989, Taiwan Office Action dated Nov. 25, 2020 (5 pgs.).
(Continued)

*Primary Examiner* — Sophie Hon
(74) *Attorney, Agent, or Firm* — Lewis Roca Rothgerber Christie LLP (57) ABSTRACT

A silicone-based adhesive protective film and an optical member including the same are provided. A silicone-based adhesive protective film is formed of a composition including a silicone resin, a crosslinking agent, and a curing catalyst, and the silicone-based adhesive protective film has a peel strength of about 3 gf/inch or less with respect to a glass plate at 25° C., and a modulus of about 0.5 MPa to about 7 MPa at 25° C.

9 Claims, 1 Drawing Sheet

(51) Int. Cl.
  *C09J 11/06* (2006.01)
  *G02B 1/14* (2015.01)
  *C09J 183/04* (2006.01)

(52) U.S. Cl.
  CPC ............. *G02B 1/14* (2015.01); *C09J 2203/00* (2013.01); *C09K 2323/053* (2020.08)

(58) Field of Classification Search
  CPC ............. C09J 2301/312; C09J 2203/00; C09J 2203/318; C09J 2483/00; G02B 1/04; G02B 1/14; G02B 1/18; C09K 2323/053; G09F 9/301; C08G 77/12; C08G 77/20; C08J 5/18; C08J 2383/07; C08J 2483/05; C08J 2483/07; C08L 83/00; C08K 5/56
  See application file for complete search history.

(56) References Cited

U.S. PATENT DOCUMENTS

2016/0355714 A1* 12/2016 Newsham ............... C08L 83/04
2018/0298232 A1* 10/2018 Huang ................... C08J 7/0427

FOREIGN PATENT DOCUMENTS

| CN | 101784631 A | | 7/2010 | |
| CN | 103210052 A | | 7/2013 | |
| CN | 103429685 A | * | 12/2013 | ............. B05D 3/007 |
| CN | 105899616 A | | 8/2016 | |
| CN | 106753195 A | * | 5/2017 | ............. C09J 183/04 |
| JP | H 07-216307 A | | 8/1995 | |
| JP | 2011185759 A | * | 9/2011 | |
| JP | 2012-46723 A | | 3/2012 | |
| KR | 2012-0050136 A | | 5/2012 | |
| KR | 101695316 B1 | * | 1/2017 | ............. C09J 183/04 |
| KR | 102513675 B1 | * | 3/2023 | ............. C09J 183/04 |
| TW | 201806768 A | | 3/2018 | |
| TW | I754200 B | * | 2/2022 | ............. C08L 83/04 |
| WO | WO 2018/048245 A1 | | 3/2018 | |

OTHER PUBLICATIONS

Chinese Office action dated May 16, 2022 issued in corresponding CN Application No. 201911377144.8, 12 pages.
Zhang Zhenying et al., "Adhesives for Plastics and Rubbers," May 31, 2004, p. 453.
Chinese Office Action dated Jun. 3, 2023, for corresponding Application No. 202211163612.3, 6 pages.

* cited by examiner

SILICONE-BASED ADHESIVE PROTECTIVE FILM AND OPTICAL MEMBER COMPRISING THE SAME

CROSS-REFERENCE TO RELATED APPLICATION

This application claims priority to and the benefit of Korean Patent Application No. 10-2018-0173918, filed on Dec. 31, 2018 in the Korean Intellectual Property Office, the entire disclosure of which is incorporated herein by reference.

BACKGROUND

1. Field

Aspects of embodiments of the present invention relate to a silicone-based adhesive protective film and an optical member including the same.

2. Description of the Related Art

Optical displays are used, stored, and manufactured in increasingly harsh environments. In addition, there is increasing interest in new optical displays, such as wearable displays and foldable displays. Accordingly, various physical properties are required for an adhesive protective film adapted to protect an optical display panel. In particular, as optical display panels become thinner and more flexible, there is increasing demand for an adhesive protective film that can cause less damage to an optical display panel upon removal from the optical display panel and can exhibit less change in physical properties, even under harsh conditions.

For these reasons, for example, acrylate or urethane acrylate-based adhesive protective films are being developed. However, such an acrylate or urethane acrylate-based adhesive protective film has significantly increased peel strength when left for a long time after being attached to an adherend and thus causes deterioration in processability and damage to and/or deformation of the adherend when peeled off of the adherend.

The background technique of the present invention is disclosed in Korean Patent Publication No. 2012-0050136 A and the like.

SUMMARY

According to aspects of embodiments of the present invention, a silicone-based adhesive protective film which has low peel strength, a low rate of change in peel strength, and good wetting properties, and an optical member including the same, are provided.

According to another aspect of embodiments of the present invention, a silicone-based adhesive protective film which has a low dissolution rate is provided.

An aspect of the present invention relates to a silicone-based adhesive protective film.

According to one or more embodiments of the present invention, a silicone-based adhesive protective film is formed of a composition including a silicone resin, a cross-linking agent, and a curing catalyst, the silicone-based adhesive protective film having a peel strength of about 3 gf/inch or less with respect to a glass plate at 25° C., and a modulus of about 0.5 MPa to about 7 MPa at 25° C.

In one or more embodiments, the silicone-based adhesive protective film may have a rate of change in peel strength of about 40% or less, as calculated according to the following Equation 2:

Rate of change in peel strength=$\{|PS_7-PS_0|/PS_0\} \times 100$, where $PS_0$ denotes an initial peel strength (unit: gf/inch) of the silicone-based adhesive protective film with respect to a glass plate, and $PS_7$ denotes a peel strength (unit: gf/inch) of the silicone-based adhesive protective film with respect to the glass plate as measured after leaving a laminate of the silicone-based adhesive protective film and the glass plate at 50° C. and 45% RH for 7 days.

In one or more embodiments, $PS_7$ in Equation 2 may be less than or equal to about 3.5 gf/inch.

In one or more embodiments, the silicone-based adhesive protective film may have a dissolution rate of about 3.5% or less, as calculated according to the following Equation 5:

Dissolution rate=$\{|WB-WA|/WA\} \times 100$, where WA denotes an initial weight (unit: g) of the silicone-based adhesive protective film, and WB denotes a dissolved weight (unit: g) of the silicone-based adhesive protective film as measured through a process in which the silicone-based adhesive protective film is placed in a vial, followed by adding methyl isobutyl ketone and stirring at 25° C. for 2 hours to prepare a gelled silicone-based adhesive protective film, and contents of the vial are filtered through a membrane filter, followed by drying solid matter retained on the membrane filter at 130° C. for 30 minutes and measuring the weight of the dried solid matter.

In one or more embodiments, the silicone resin may include a mixture of a first silicone resin and a second silicone resin, wherein the first silicone resin and the second silicone resin may be present in a ratio in parts by weight (first silicone resin:second silicone resin) of about 30:70 to about 70:30 relative to 100 parts by weight of the mixture.

In one or more embodiments, the first silicone resin may be represented by the following Formula 1:

$(R_3SiO_{1/2})_{4-p}(R_2SiO)_m(RR^1SiO)_n(SiO_{4/2})(R^1R_2SiO_{1/3})_p$ where R is a hydroxyl group, a $C_1$ to $C_{10}$ alkyl group, or a $C_2$ to $C_{10}$ alkenyl group, $R^1$ is a $C_2$ to $C_{10}$ alkenyl group, p is from 1 to 4, m is from 100 to 10,000, n is 0 or is greater than m, and m+n is from 100 to 10,000.

In one or more embodiments, the first silicone resin may be , where Me is a methyl group, Vi is a vinyl group, and m and p are as defined in Formula 1.

In one or more embodiments, the second silicone resin may be represented by the following Formula 2:

where R is a hydroxyl group, a $C_1$ to $C_{10}$ alkyl group, or a $C_2$ to $C_{10}$ alkenyl group, $R^1$ is a $C_2$ to $C_{10}$ alkenyl group, p is in from 0 to 2, m is from 1,000 to 10,000, and n is from 10 to 500.

In one or more embodiments, the second silicone resin may include at least one selected from the group of $((Me)_3SiO_{1/2})_2((Me)_2SiO)_m(HeMeSiO)_n$ and $(Vi(Me)_2SiO_{1/2})_2((Me)_2SiO)_m(HeMeSiO)_n$, where Me is a methyl group, He is a hexenyl group, and m and n are as defined in Formula 2.

In one or more embodiments, the composition for silicone-based adhesive protective films may further include an anchoring agent.

In one or more embodiments, the composition for silicone-based adhesive protective films may be free from a silicone resin composed of $R^3R^4_2SiO_{1/2}$, where $R^3$ is a $C_1$ to $C_{10}$ alkyl group, a $C_2$ to $C_{10}$ alkenyl group, a $C_6$ to $C_{10}$ aryl group, or $C_6$ to $C_{10}$ hydroxyl group, and $R^4$ is a $C_1$ to $C_{10}$ alkyl group, and $SiO_{4/2}$ units.

In one or more embodiments, the silicone resin composed of $R^3R^4_2SiO_{1/2}$ and $SiO_{4/2}$ units may include an MQ silicone resin including $Me_3SiO_{1/2}$ and $SiO_{4/2}$ units.

In one or more embodiments, the composition for silicone-based adhesive protective films may be free from at least one selected from the group of a (meth)acrylic adhesive resin and a silicone (meth)acrylate adhesive resin.

According to one or more embodiments of the present invention, an optical member includes: an optical film; and a silicone-based adhesive protective film formed on a surface of the optical film, wherein the silicone-based adhesive protective film is the silicone-based adhesive protective film according to any of the above-described embodiments.

According to an aspect of embodiments of the present invention, a silicone-based adhesive protective film has low peel strength, a low rate of change in peel strength, and good wetting properties.

According to another aspect of embodiments of the present invention, a silicone-based adhesive protective film has a low dissolution rate.

DETAILED DESCRIPTION

Herein, some example embodiments of the present invention will be described in further detail. It should be understood that the present invention is not limited to the following embodiments and may be embodied in different ways. In addition, it should be understood that the embodiments are provided for disclosure and thorough understanding of the present invention and so as to fully convey the spirit of the present invention to those skilled in the art to which the present invention pertains.

As used herein, "modulus" refers to Young's modulus. The modulus may be measured by a method prescribed in an experimental example described further below. Unless otherwise stated, the modulus may be a value measured at 25° C.

As used herein, "peel strength" refers to peel strength of a silicone-based adhesive protective film with respect to a glass plate, as measured under conditions of a temperature of 25° C., a peeling rate of 2,400 mm/min, and a peeling angle of 180°. The peel strength may be measured by a method prescribed in an experimental example described further below.

As used herein, "Me" denotes a methyl group, "Vi" denotes a vinyl group, "Pr" denotes a propyl group, and "He" denotes a hexenyl group. The "hexenyl group" may be a 1-hexenyl group, 2-hexenyl group, 3-hexenyl group, 4-hexenyl group, or 5-hexenyl group.

As used herein to represent a specific numerical range, the expression "X to Y" means "greater than or equal to X and less than or equal to Y (X≤ and ≤Y)".

According to an aspect of the present invention, a silicone-based adhesive protective film is formed of a composition including a silicone resin, a crosslinking agent, and a curing catalyst, wherein the silicone-based adhesive protective film has a peel strength of 3 gf/inch or less and a modulus of 0.5 MPa to 7 MPa. Within this range of peel strength, the silicone-based adhesive protective film can prevent or substantially prevent damage to or deformation of an adherend when peeled off of the adherend after being adhesively bonded to the adherend. As used herein, the term "adherend" may refer to a plastic film, a panel including a plastic film (for example, a panel of an organic light emitting diode display), a glass plate, or the like, without being limited thereto. Within this range of modulus, the silicone-based adhesive protective film has good wetting properties with respect to an adherend and thus can prevent or substantially prevent formation of bubbles when adhesively bonded to the adherend, thereby improving processability upon cutting a laminate of the silicone-based adhesive protective film and the adherend. In addition, within this range of modulus, the silicone-based adhesive protective film has a low rate of change in peel strength, as described below, and thus can avoid increase in peel strength, even when stored for a long period of time after being adhesively bonded to an adherend, thereby preventing or substantially preventing damage to and/or deformation of the adherend when peeled off of the adherend after long-term storage, and thus allowing improvement in storage stability.

The peel strength refers to an initial peel strength described below and, in an embodiment, is greater than about 0 gf/inch and less than or equal to about 3 gf/inch or less, and, in an embodiment, from about 1 gf/inch to about 3 gf/inch.

In an embodiment, the modulus is in a range from about 0.5 MPa to about 5 MPa and, in an embodiment, about 0.8 MPa to about 4 MPa.

Herein, a silicone-based adhesive protective film according to an embodiment of the present invention will be described.

In an embodiment, the silicone-based adhesive protective film has a rate of change in peel strength of about 30% or less, for example, about 0% to about 30%, about 3% to about 20%, or about 10% % to about 20%, as calculated according to the following Equation 1, and a rate of change in peel strength of about 40% or less, for example, about 0% to about 40%, about 8% to about 30%, about 8% to about 28%, or about 8% to about 25%, as calculated according to the following Equation 2. Within these ranges, even after long-term storage of a laminate of the silicone-based adhesive protective film and a release film or an adherend, the silicone-based adhesive protective film can be easily peeled off of the release film or the adherend, thereby allowing reduction in deformation of or damage to the release film or the adherend.

$$\text{Rate of change in peel strength} = \{|PS_3 - PS_0|/PS_0\} \times 100, \qquad \text{Equation 1}$$

where $PS_0$ denotes an initial peel strength (unit: gf/inch) of the silicone-based adhesive protective film with respect to a glass plate, and $PS_3$ denotes a peel strength (unit: gf/inch) of the silicone-based adhesive protective film with respect to the glass plate as measured after leaving a laminate of the silicone-based adhesive protective film and the glass plate at 50° C. and 45% RH for 3 days.

$$\text{Rate of change in peel strength} = \{|PS_7 - PS_0|/PS_0\} \times 100, \qquad \text{Equation 2}$$

where $PS_0$ denotes an initial peel strength (unit: gf/inch) of the silicone-based adhesive protective film with respect to a glass plate, and $PS_7$ denotes a peel strength (unit: gf/inch) of the silicone-based adhesive protective film with respect to the glass plate as measured after leaving a laminate of the silicone-based adhesive protective film and the glass plate at 50° C. and 45% RH for 7 days.

In an embodiment, $PS_3$ in Equation 1 may be less than or equal to 5 gf/inch, and, in an embodiment, greater than about 0 gf/inch and less than or equal to about 5 gf/inch, and, in an embodiment, about 1 gf/inch to about 4 gf/inch.

In an embodiment, $PS_7$ in Equation 2 may be less than or equal to about 3.5 gf/inch, and, in an embodiment, greater than about 0 gf/inch and less than or equal to about 3.5 gf/inch, and, in an embodiment, about 1 gf/inch to about 3.5 gf/inch.

In an embodiment, the silicone-based adhesive protective film may have a rate of change in modulus of about 20% or less, for example, about 0% to about 20% or about 5% to about 15%, as calculated according to the following Equation 3, and a rate of change in modulus of about 30% or less, for example, about 0% to about 30% or about 5% to about 25%, as calculated according to the following Equation 4. Within these ranges, even when adhesively bonded to an adherend after long-term storage, the silicone-based adhesive protective film can have good wetting properties and, thus, good reliability.

$$\text{Rate of change in modulus} = \{(M_3 - M_0)/M_0\} \times 100, \quad \text{Equation 3}$$

where $M_0$ denotes an initial modulus (unit: MPa) of the silicone-based adhesive protective, and $M_3$ denotes a modulus (unit: MPa) of the silicone-based adhesive protective film as measured after leaving the silicone-based adhesive protective film at 50° C. and 45% RH for 3 days.

$$\text{Rate of change in modulus} = \{(M_7 - M_0)/M_0\} \times 100, \quad \text{Equation 4}$$

where $M_0$ denotes an initial modulus (unit: MPa) of the silicone-based adhesive protective, and $M_7$ denotes a modulus (unit: MPa) of the silicone-based adhesive protective film as measured after leaving the silicone-based adhesive protective film at 50° C. and 45% RH for 7 days.

In an embodiment, $M_3$ in Equation 3 may be in a range from about 0.5 MPa to about 5 MPa, and, in an embodiment, about 0.8 MPa to about 4 MPa. In an embodiment, $M_7$ in Equation 4 may be in a range from about 0.8 MPa to about 6 MPa, and, in an embodiment, about 1 MPa to about 5 MPa.

In an embodiment, the silicone-based adhesive protective film may have a dissolution rate of about 3.5% or less, as calculated according to the following Equation 5, for example, about 0% to about 3.5% or about 1% to about 3.5%. Within this range, upon contact with a solvent or the like, the silicone-based adhesive protective film can retain physical properties thereof and thus have good reliability.

$$\text{Dissolution rate} = \{|WB - WA|/WA\} \times 100, \quad \text{Equation 5}$$

where WA denotes an initial weight (unit: g) of the silicone-based adhesive protective film, and WB denotes a dissolved weight (unit: g) of the silicone-based adhesive protective film, as measured through a process in which the silicone-based adhesive protective film is placed in a vial, followed by adding methyl isobutyl ketone and stirring at 25° C. for 2 hours to prepare a gelled silicone-based adhesive protective film, and contents of the vial are filtered through a membrane filter, followed by drying solid matter retained on the membrane filter at 130° C. for 30 minutes and measurement of the dried solid matter.

In an embodiment, the silicone-based adhesive protective film may have a haze of about 5% or less, for example, about 0% to about 1%. Within this range, the silicone-based adhesive protective film can be used in optical displays.

In an embodiment, the silicone-based adhesive protective film may have a thickness of about 100 μm or less, for example, about 75 μm or less, for example, greater than about 0 μm and less than or equal to about 75 μm. Within this range, the silicone-based adhesive protective film can protect an adherend when adhesively bonded to the adherend, and can be easily peeled off of the adhered in a subsequent process.

The silicone-based adhesive protective film may be formed of a composition for silicone-based adhesive protective films. Next, the composition for silicone-based adhesive protective films will be described.

The composition for silicone-based adhesive protective films may include a silicone resin, a crosslinking agent, and a curing catalyst.

In an embodiment, the composition includes a mixture of a first silicone resin and a second silicone resin as the silicone resin. Here, the first silicone resin and the second silicone resin may include different siloxane units.

In an embodiment, the first silicone resin and the second silicone resin may be present in a ratio in parts by weight (first silicone resin:second silicone resin) of about 30:70 to about 70:30 relative to 100 parts by weight of the mixture. Within this range, the silicone-based adhesive protective film can have good wetting properties and a low rate of change in peel strength over time. In an embodiment, the first silicone resin and the second silicone resin are present in a ratio in parts by weight (first silicone resin:second silicone resin) of about 40:60 to about 60:40 relative to 100 parts by weight of the mixture.

In an embodiment, the first silicone resin may include an organopolysiloxane resin having at least one alkenyl group at a terminal thereof. In addition, the first silicone resin may include a linear or branched silicone resin. For example, the first silicone resin may be represented by the following Formula 1:

where R is a hydroxyl group, a $C_1$ to $C_{10}$ alkyl group, or a $C_2$ to $C_{10}$ alkenyl group, $R^1$ is a $C_2$ to $C_{10}$ alkenyl group, p is in a range from 1 to 4 on average, m is in a range from 100 to 10,000 on average, n is 0 on average or is greater than m on average, and m+n is in a range from 100 to 10,000 on average. For example, m may be in a range from 200 to 3,000 on average. For example, the $(R_3SiO_{1/2})$ unit may be $(Me)_3SiO_{1/2}$ or $(Me)_2PrSiO_{1/2}$. For example, the $(R_2SiO)$ unit may be $(Me)_2SiO$ or MePrSiO. For example, the $(RR^1SiO)$ unit may be ViMeSiO. For example, the $(R^1R_2SiO_{1/2})$ unit may be $Vi(Me)_2SiO_{1/2}$.

In an embodiment, the first silicone resin is represented by the following Formula 1-1:

where R, $R^1$, m, and p are the same as defined in Formula 1.

In an embodiment, the first silicone resin may be $((Me)_3SiO_{1/2})_{4-p}((Me)_2SiO)_m(SiO_{4/2})(Vi(Me)_2SiO_{1/2})_p$ (where m and p are the same as defined in Formula 1).

In an embodiment, the first silicone resin may have a weight average molecular weight of about 50,000 or more, and, in an embodiment, about 50,000 to about 200,000. Within this range, the silicone-based adhesive protective film can have a low rate of change in peel strength over time.

In an embodiment, the second silicone resin may include an organopolysiloxane resin having at least one alkenyl group at a side chain thereof. In addition, the second silicone resin may include a linear or branched silicone resin. The second silicone resin may be represented by the following Formula 2:

where R is a hydroxyl group, a $C_1$ to $C_{10}$ alkyl group, or a $C_2$ to $C_{10}$ alkenyl group, $R^1$ is a $C_2$ to $C_{10}$ alkenyl group, p is in a range from 0 to 2 on average, m is in a range from 1,000 to 10,000 on average, and n is in a range from 10 to 500 on average. For example, the $(R_3SiO_{1/2})$ unit may be $(Me)_3SiO_{1/2}$ or $(Me)_2PrSiO_{1/2}$. For example, the $(R_2SiO)$ unit may be $(Me)_2SiO$ or MePrSiO. For example, the $(RR^1SiO)$ unit may be ViMeSiO or HeMeSiO. For example, the $(R^1R_2SiO_{1/2})$ unit may be $Vi(Me)_2SiO_{1/2}$. For example, p may be an integer of 1 to 2.

In an embodiment, the second silicone resin may include an organopolysiloxane resin having at least one alkenyl group at a terminal thereof. In an embodiment, the second silicone resin is represented by the following Formula 2-1:

where R, $R^1$, m and n are as defined as in Formula 2 and p is an integer of 0 to 2.

In some embodiments, the second silicone resin may include at least one selected from the group of $((Me)_3SiO_{1/2})_2$ $((Me)_2SiO)_m(HeMeSiO)_n$ and $(Vi(Me)_2SiO_{1/2})_2$ $((Me)_2SiO)_m(HeMeSiO)_n$ (where m and n are the same as defined in Formula 2).

In an embodiment, the second silicone resin may have a weight average molecular weight of about 100,000 or more, and, in an embodiment, about 100,000 to about 1,000,000. Within this range, the silicone-based adhesive film can have improved wetting properties and a low rate of change in peel strength over time.

In an embodiment, the crosslinking agent may include an organohydrogensiloxane resin having at least two silicon-bonded hydrogens (Si—H) per molecule. The crosslinking agent cures the first silicone resin and the second silicone resin through hydrosilylation with alkenyl groups of each of the first and second silicone resins. Besides a hydrogen atom, organic groups can form a bond with silicon, and examples thereof may include alkyl groups, such as a methyl group, an ethyl group, a propyl group, a butyl group, a pentyl group, and a hexyl group, aryl groups, such as a phenyl group, a tolyl group, and a xylyl group, and arylalkyl groups, such as a benzyl group and a phenethyl group.

In an embodiment, the crosslinking agent may be represented by the following Formula 3:

where R is a $C_1$ to $C_{10}$ alkyl group, $R^1$ is hydrogen or a $C_1$ to $C_{10}$ alkyl group, m is in a range from 0 to 500 on average, and n is in a range from 1 to 500 on average.

Examples of the crosslinking agent may include methylhydrogenpolysiloxane capped with a trimethylsiloxy group at both molecular terminals and a methylhydrogensiloxane-dimethylsiloxane copolymer capped with a trimethylsiloxy group at both molecular terminals.

In an embodiment, the crosslinking agent may be present in an amount of about 1 part by weight to about 5 parts by weight, and, in an embodiment, about 1 part by weight to about 3 parts by weight, relative to 100 parts by weight of the first silicone resin and the second silicone resin. Within this range, the silicone-based adhesive protective film can have a low rate of change in peel strength over time.

The curing catalyst promotes reaction between the first silicone resin, the second silicone resin, and the crosslinking agent. The curing catalyst may include platinum catalysts, ruthenium catalysts, or osmium catalysts. In an embodiment, the curing catalyst may include any of typical platinum catalysts known to those skilled in the art. For example, the curing catalyst may include any of chloroplatinic acid, an alcoholic solution of chloroplatinic acid, a complex of chloroplatinic acid and olefin, and a complex of chloroplatinic acid and alkenylsiloxane.

In an embodiment, the curing catalyst may be present in an amount of about 0.1 parts by weight to about 3 parts by weight, and, in an embodiment, about 0.5 parts by weight to about 2 parts by weight, relative to 100 parts by weight of the first silicone resin and the second silicone resin. Within this range, the silicone-based adhesive protective film can have a low rate of change in peel strength over time.

In an embodiment, the composition for silicone-based adhesive protective films may further include an anchoring agent.

The anchoring agent can further increase peel strength of the silicone-based adhesive protective film. The anchoring agent may include any of typical siloxane compounds known to those skilled in the art. In an embodiment, the anchoring agent may include at least one selected from the group of vinyltriethoxysilane, allyltrimethoxysilane, allyltriethoxysilane, 3-glycidoxypropyltrimethoxysilane, and 3-(meth)acryloxypropyltrimethoxysilane.

In an embodiment, the anchoring agent may be present in an amount of less than about 1 part by weight, and, in an embodiment, more than or equal to about 0.05 parts by weight and less than about 1 part by weight, and, in an embodiment, about 0.1 parts by weight to about 0.5 parts by weight, relative to 100 parts by weight of the first silicone resin and the second silicone resin. Within this range, the silicone-based adhesive protective film can have good adhesion to a base film.

In an embodiment, the composition for silicone-based adhesive protective films may further include an organic solvent to increase coatability of the composition to obtain a thin coating film. The organic solvent may include toluene, xylene, hexene, heptane, and methyl ethyl ketone, without being limited thereto.

In an embodiment, the composition for silicone-based adhesive protective films may further include a hydrosilylation inhibitor. The hydrosilylation inhibitor inhibits reaction between the first silicone resin and the crosslinking agent and/or reaction between the second silicone resin and the crosslinking agent to impart a desired level of viscosity to the composition while improving storage stability of the composition. The hydrosilylation inhibitor may include any of typical hydrosilylation inhibitors known to those skilled in the art. For example, the hydrosilylation inhibitor may include 3-methyl-1-butyn-1-ol and 3,5-dimethyl-1-butyn-1-ol, without being limited thereto.

In an embodiment, the composition may be free from a silicone resin composed of $R^3R^4_2SiO_{1/2}$ and $SiO_{4/2}$ units. Here, $R^3$ is a $C_1$ to $C_{10}$ alkyl group, a $C_2$ to $C_{10}$ alkenyl group, a $C_6$ to $C_{10}$ aryl group, or a $C_6$ to $C_{10}$ hydroxyl group, and $R^4$ is a $C_1$ to $C_{10}$ alkyl group. When the composition includes the silicone resin composed of $R^3R^4_2SiO_{1/2}$ and $SiO_{4/2}$ units, the silicone-based adhesive protective film can have excessively high peel strength and have problems of increase in initial peel strength and reduction in curing rate. For example, the silicone resin composed of $R^3R^4_2SiO_{1/2}$ and $SiO_{4/2}$ units may include an MQ silicone resin having $Me_3SiO_{1/2}$ and $SiO_{4/2}$ units.

In an embodiment, the composition may be free from at least one selected from the group of a (meth)acrylic adhesive resin and a silicone (meth)acrylate-based adhesive resin.

An optical member according to an embodiment of the present invention includes an optical film and an adhesive protective film formed on at least one surface of the optical film, wherein the adhesive protective film may include the silicone-based adhesive protective film according to an embodiment of the present invention.

The optical film may be used in a display panel and may include a polyimide film. In an embodiment, the optical film may be composed of a light emitting diode layer and a polyimide film formed on at least one surface of the light emitting diode layer. The optical member may further include an organic or inorganic insulating film between the optical film and the silicone-based adhesive protective film. The optical member may further include a release film (e.g., a liner) formed on the other surface of the silicone-based adhesive protective film. The release film serves to prevent or substantially prevent the adhesive protective film from being contaminated by foreign matter. The release film may be an optical film that is formed of a same material as the optical film or formed of a different material than the optical film. For example, the release film may be a film formed of at least one selected from the group of a polyethylene terephthalate resin, a polycarbonate resin, a polyimide resin, a poly(meth)acrylate resin, a cyclic olefin polymer resin, and an acrylic resin. In an embodiment, the release film may have a thickness of about 10 μm to about 100 μm, and, in an embodiment, about 10 μm to about 50 μm. Within this range, the release film can support the adhesive protective film.

Next, the present invention will be described in further detail with reference to some examples. However, it should be noted that these examples are provided for purposes of illustration and should not be construed in any way as limiting the present invention.

Example 1

(1) Preparation of First Silicone Resin (I)

A dimethylvinylsiloxane-dimethylsiloxane-dimethylvinylsiloxane resin capped with dimethylvinylsiloxane at both terminals of a molecular chain was used as the first silicone resin. The first silicone resin contained 900 dimethylsiloxane units and had a weight average molecular weight of 65,000.

First, 21.6 g of $[Vi(Me)_2SiO_{1/2}]SiO_{4/2}$ and 592.6 g of octamethylcyclotetrasiloxane were introduced into a reactor filled with nitrogen, followed by heating to 150° C. Then, 50 ppm of a linear polyaminophosphazenium hydroxide catalyst ($[Py3-N-(P=NPy2)1.8-PPy3]^+OH^-$ (where Py is pyrrolidine)) was added, followed by neutralization under stirring for 1 minute. Then, the reactor was cooled to room temperature, followed by removal of volatile matter, thereby preparing the first silicone resin (I).

(2) Preparation of Second Silicone Resin (I)

A dimethylvinylsiloxane-dimethylsiloxane-methylhexenylsiloxane-dimethylvinylsiloxane resin capped with dimethylvinylsiloxane at both terminals of a molecular chain was used as the second silicone resin. The second silicone resin contained 6,000 dimethylsiloxane units and 36 methylhexenylsiloxane units and had a weight average molecular weight of 670,000.

First, 225 g of water was added to a mixture of 100 g of 5-hexenylmethyldichlorosilane and 75 g of toluene, followed by stirring for 1.5 hours. Then, the resulting toluene layer was separated from water, washed with an aqueous solution of 10% sodium hydrogen carbonate, and washed with 75 ml of water. Then, water was removed from the resulting residue, thereby preparing a hydrolysate of 5-hexenylmethyldichlorosilane. Then, 10.39 g of the hydrolysate of 5-hexenylmethyldichlorosilane, 276.9 g of cyclopolydimethylsiloxane, 16.89 g of dimethylvinylsiloxane, and 1.79 g of a potassium silanolate catalyst were mixed together, followed by heating to 150° C. for 4 hours. The second silicone resin was obtained from the resulting product.

(3) Preparation of Silicone-Based Adhesive Protective Film

First, 20 parts by weight of toluene was mixed with 50 parts by weight of the prepared first silicone resin (I) and 50 parts by weight of the prepared second silicone resin (I). Then, 1.5 parts by weight of a crosslinking agent, 1 part by weight of a curing catalyst, 0.1 parts by weight of an anchoring agent, and 10 parts by weight of toluene were further mixed with the resulting mixture, thereby preparing a composition for silicone-based adhesive protective films.

Then, the prepared composition was coated onto a release film (polyethylene terephthalate film) to a predetermined thickness, followed by curing at 130° C. for 5 minutes, thereby preparing a laminate of a silicone-based adhesive protective film and the release film.

As the crosslinking agent, a dimethylsiloxane-methylhydrogensiloxane resin capped with a trimethylsiloxy group at both terminals was used. As the curing catalyst, a 1,3-divinyl-1,1,3,3-tetramethyldisiloxane platinum complex was used. As the anchoring agent, glycidoxypropyltrimethoxysilane was used.

Examples 2 to 4

A silicone-based adhesive protective film was prepared in the same manner as in Example 1 except that the amount of the anchoring agent was changed as shown in Table 1.

Examples 5 to 6

A silicone-based adhesive protective film was prepared in the same manner as in Example 1 except that the amounts of the first silicone resin (I) and the second silicone resin (I) were changed as shown in Table 1.

Example 7

A silicone-based adhesive protective film was prepared in the same manner as in Example 1 except that, instead of the first silicone resin (I), a 7646 silicone resin (11) (Dow Chemical, Mw: 124,000) was used as the first silicone resin, and the amounts of the first silicone resin (II) and the second silicone resin (I) were changed as shown in Table 1.

Example 8

A silicone-based adhesive protective film was prepared in the same manner as in Example 1 except that, instead of the second silicone resin (I), a 7664 silicone resin (II) (Dow Chemical, Mw: 554,000) was used as the second silicone resin.

Comparative Examples 1 to 2

A silicone-based adhesive protective film was prepared in the same manner as in Example 1 except that the amount of each component of the composition for silicone-based adhesive protective films was changed as shown in Table 2.

Comparative Example 3

A silicone-based adhesive protective film was prepared in the same manner as in Example 1 except that 5 parts by weight of an MQ resin was further added as shown in Table 2. Here, the MQ resin was a silicone resin including $Me_3SiO_{1/2}$ (Me being a methyl group) and $SiO_{4/2}$ units.

Each of the compositions for silicone-based adhesive protective films/silicone-based adhesive protective films prepared in Examples 1 to 8 and Comparative Examples 1 to 3 was evaluated as to the following physical properties. Results are shown in Tables 1 and 2.

(1) Initial peel strength (unit: gf/inch): each of the compositions for adhesive protective films prepared in the Examples and Comparative Examples was subjected to degassing and then coated onto a polyethylene terephthalate (PET) film to a thickness of 25 μm, followed by curing at 130° C. for 5 minutes, thereby preparing a laminate of a 25 μm thick silicone-based adhesive protective film and the PET film.

The laminate was cut to a size of 20 cm×2.5 cm (length×width), thereby obtaining a specimen. The specimen was attached to a glass plate and then pressed with a 2 kg roller. Then, peel strength of the specimen with respect to the glass plate was measured under conditions of a peeling rate of 2,400 mm/min, a peeling angle of 180°, and a temperature of 25° C. using a texture analyzer (TA). Here, the peel strength was measured on a total of three specimens, followed by calculation of average of the measured values. The calculated average was defined as "initial peel strength" ($PS_0$).

Figure 1:
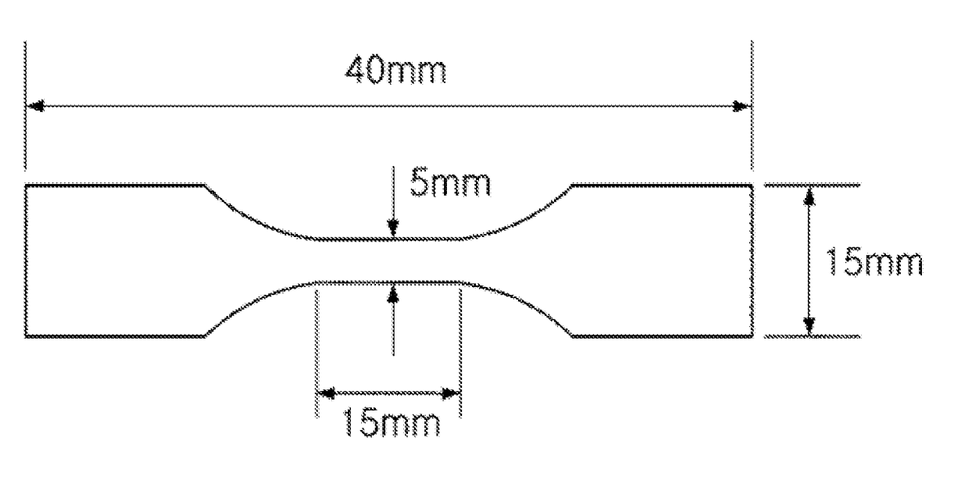
The drawing is a plan view of a specimen for measurement of modulus of a silicone-based adhesive protective film, prepared in an experimental example according to the present invention.

(2) Modulus (unit: MPa): Each of the compositions for adhesive protective films prepared in the Examples and Comparative Examples was coated onto a surface of a fluorinated film (FL-75BML, Dongwon Intec Co., Ltd) to a predetermined thickness and then a PET film was attached to the resulting coating layer, followed by curing at 130° C. for 5 minutes, thereby preparing a laminate in which a 75 μm thick silicone-based adhesive protective film was interposed between the fluorinated film and the PET film. Then, the laminate was cut into a dog bone shape as shown in the drawing, followed by removal of the fluorinated film and the PET film, thereby preparing a specimen for measurement of modulus.

Referring to the drawing, the prepared specimen had a dog bone shape and had an overall length of 40 mm, an overall width of 15 mm, and a thickness of 75 μm. Modulus of the specimen was measured using a modulus testing machine (Instron Corp.). Specifically, the left end of the dog bone-shaped specimen of the drawing was connected to a first jig of the modulus testing machine, and the right end of the specimen was connected to a second jig of the modulus testing machine. Here, a portion of the left end connected to the first jig had a same area as a portion of the right end connected to the second jig. Then, with the first jig locked in place, the specimen was stretched on the second jig under conditions of load cell: 1 kN, tensile rate: 50 mm/min, and temperature: 25° C. until breakage of a portion of the dog bone-shaped specimen of the drawing, which is indicated by a length of 15 mm and a width of 5 mm, thereby obtaining modulus of the specimen.

(3) Peel strength after 3 days (unit: gf/inch) and rate of change in peel strength (%) according to Equation 1: a laminate of a silicone-based adhesive protective film and a PET film was prepared in the same manner as in (1) and then attached to a glass plate, thereby preparing a specimen for measurement of peel strength. Initial peel strength ($PS_0$) was measured in the same manner as in (1). Then, the laminate was left at 50° C. and 45% RH for 3 days, followed by measurement of peel strength after 3 days ($PS_3$) in the same manner as in (1). Then, a rate of change in peel strength was calculated according to Equation 1.

(4) Peel strength after 7 days (unit: gf/inch) and rate of change in peel strength (%) according to Equation 2: a laminate of a silicone-based adhesive protective film and a PET film was prepared in the same manner as in (1) and then attached to a glass plate, thereby preparing a specimen for measurement of peel strength. Initial peel strength ($PS_0$) was measured in the same manner as in (1). Then, the laminate was left at 50° C. and 45% RH for 7 days, followed by measurement of peel strength after 7 days ($PS_7$) in the same manner as in (1). Then, a rate of change in peel strength was calculated according to Equation 2.

(5) Dissolution rate (unit: %) of silicone-based adhesive protective film: a laminate of a silicone-based adhesive protective film and a PET film was prepared in the same manner as in (1). Then, 1 g of the silicone-based adhesive protective film was placed in a 40 ml vial, and then 15 g of methyl isobutyl ketone was added to allow the silicone-based adhesive protective film to be completely immersed therein, followed by stirring in a stirrer at 25° C. for 2 hours. Then, the resulting gelled solution in the vial was filtered under reduced pressure through a membrane filter (pore size: 0.45 μm), and solid matter retained on the membrane filter was washed three times with 100 ml of methyl isobutyl ketone to collect the solid matter. Then, the collected solid matter was dried at 130° C. for 30 minutes, followed by measurement of the dissolved amount of the silicone-based adhesive protective film. A dissolution rate of the adhesive protective film was calculated according to Equation 5.

TABLE 1

|  | Example | | | | | | | |
| --- | --- | --- | --- | --- | --- | --- | --- | --- |
|  | 1 | 2 | 3 | 4 | 5 | 6 | 7 | 8 |
| First silicone resin (I) | 50 | 50 | 50 | 50 | 30 | 70 | 0 | 50 |
| First silicone resin (II) | 0 | 0 | 0 | 0 | 0 | 0 | 30 | 0 |
| Second silicone resin (I) | 50 | 50 | 50 | 50 | 70 | 30 | 70 | 0 |
| Second silicone resin (II) | 0 | 0 | 0 | 0 | 0 | 0 | 0 | 50 |
| Crosslinking agent | 1.5 | 1.5 | 1.5 | 1.5 | 1.5 | 1.5 | 1.5 | 1.5 |
| Curing catalyst | 1 | 1 | 1 | 1 | 1 | 1 | 1 | 1 |
| Anchoring agent | 0.1 | 0.2 | 0.5 | 0 | 0.1 | 0.1 | 0.1 | 0.1 |
| Initial peel strength | 2.60 | 2.58 | 2.70 | 2.59 | 1.8 | 2.8 | 2.9 | 2.7 |
| Modulus | 2.8 | 2.78 | 2.90 | 2.78 | 3.5 | 1.5 | 2.5 | 2.7 |
| Peel strength after 3 days | 2.96 | 2.98 | 3.12 | 2.70 | 2.1 | 3.1 | 3.2 | 2.85 |
| Equation 1 | 13.85 | 15.50 | 15.56 | 4.25 | 16.67 | 10.71 | 10.34 | 5.56 |
| Peel strength after 7 days | 3.1 | 3.05 | 3.15 | 2.81 | 2.3 | 3.3 | 3.5 | 3.0 |
| Equation 2 | 19.23 | 18.22 | 16.67 | 8.49 | 27.78 | 17.86 | 20.69 | 11.11 |
| Dissolution rate | 2.8 | 2.9 | 3.1 | 3.2 | 2.4 | 3.5 | 2.4 | 3.3 |

TABLE 2

|  | Comparative Example | | |
|---|---|---|---|
|  | 1 | 2 | 3 |
| First silicone resin (I) | 0 | 0 | 50 |
| First silicone resin (II) | 100 | 0 | 0 |
| Second silicone resin (I) | 0 | 100 | 50 |
| Crosslinking agent | 1.5 | 0.5 | 1.5 |
| Curing catalyst | 1 | 1 | 1 |
| Anchoring agent | 1 | 0.1 | 0.1 |
| MQ resin | 0 | 0 | 5 |
| Initial peel strength | 5.02 | 1.8 | 4.2 |
| Modulus | 1.7 | 9 | 3.2 |
| Peel strength after 3 days | 7.2 | 1.9 | 5 |
| Equation 1 | 43.43 | 5.56 | 19.05 |
| Peel strength after 7 days | 10.5 | 2.0 | 7.2 |
| Equation 2 | 109.16 | 11.11 | 71.43 |
| Dissolution rate | 4.5 | 2.5 | 3.5 |

As shown in Table 1, the silicone-based adhesive protective films according to the present invention had low peel strength, a low rate of change in peel strength, and a low dissolution rate. In addition, the silicone-based adhesive protective films according to the present invention had a modulus within the range according to the present invention and thus had good wetting properties. By contrast, as shown in Table 2, the silicone-based adhesive protective films of the Comparative Examples failed to provide the desired effects of the present invention.

While some example embodiments have been described herein, it should be understood that various modifications, changes, alterations, and equivalent embodiments can be made by those skilled in the art without departing from the spirit and scope of the present invention.

What is claimed is:

1. A silicone-based adhesive protective film formed of a composition for silicone-based adhesive protective films comprising a silicone resin, a crosslinking agent, and a curing catalyst,
   wherein the silicone resin comprises at least one of a first silicone resin represented by the following Formula 1 and a second silicone resin represented by the following Formula 2:

$(R_3SiO_{1/2})_{4-p}(R_2SiO)_m(RR^1SiO)_n(SiO_{4/2})(R^1R_2SiO_{1/2})_p$,      Formula 1 where R is a hydroxyl group, a $C_1$ to $C_{10}$ alkyl group, or a $C_2$ to $C_{10}$ alkenyl group,
   $R^1$ is a $C_2$ to $C_{10}$ alkenyl group,
   p is from 1 to 4,
   m is from 100 to 10,000,
   n is 0 or is greater than m, and
   m+n is from 100 to 10,000;

$(R_3SiO_{1/2})_{2-p}(R_2SiO)_m(RR^1SiO)_n(R^1R_2SiO_{1/2})_p$,      Formula 2 where R is a hydroxyl group, a $C_1$ to $C_{10}$ alkyl group, or a $C_2$ to $C_{10}$ alkenyl group,
   $R^1$ is a $C_2$ to $C_{10}$ alkenyl group,
   p is from 0 to 2,
   m is from 1,000 to 10,000, and
   n is from 10 to 500;
   wherein the composition for silicone-based adhesive protective films is free from (meth)acrylic adhesive resin, silicone (meth)acrylate adhesive resin, and silicone resin composed of $R^3R^4{}_2SiO_{1/2}$ and $SiO_{4/2}$ units,
   where $R^3$ is a $C_1$ to $C_{10}$ alkyl group, a $C_2$ to $C_{10}$ alkenyl group, a $C_6$ to $C_{10}$ aryl group, or a $C_6$ to $C_{10}$ hydroxyl group, and $R^4$ is a $C_1$ to $C_{10}$ alkyl group, the silicone-based adhesive protective film having a peel strength of about 1 gf/inch or more and less than or equal to about 3 gf/inch with respect to a glass plate at 25° C., and a modulus of about 0.5 MPa to about 7 MPa at 25° C., and
the silicone-based adhesive protective film has a rate of change in peel strength of about 40% or less, as calculated according to the following Equation 2:

Rate of change in peel strength=$\{|PS_7-PS_0|/PS_0\}\times 100$, where $PS_0$ denotes an initial peel strength (unit: gf/inch) of the silicone-based adhesive protective film with respect to a glass plate, and
$PS_7$ denotes a peel strength (unit: gf/inch) of the silicone-based adhesive protective film with respect to the glass plate as measured after leaving a laminate of the silicone-based adhesive protective film and the glass plate at 50° C. and 45% RH for 7 days.

2. The silicone-based adhesive protective film according to claim 1, wherein $PS_7$ in Equation 2 is less than or equal to about 3.5 gf/inch.

3. The silicone-based adhesive protective film according to claim 1, wherein the silicone-based adhesive protective film has a dissolution rate of about 3.5% or less, as calculated according to the following Equation 5:

Dissolution rate=$\{|WB-WA|/WA\}\times 100$, where WA denotes an initial weight (unit: g) of the silicone-based adhesive protective film, and
WB denotes a dissolved weight (unit: g) of the silicone-based adhesive protective film as measured through a process in which the silicone-based adhesive protective film is placed in a vial, followed by adding methyl isobutyl ketone and stirring at 25° C. for 2 hours to prepare a gelled silicone-based adhesive protective film, and contents of the vial are filtered through a membrane filter, followed by drying solid matter retained on the membrane filter at 130° C. for 30 minutes to obtain a dried solid matter and measuring a weight of the dried solid matter.

4. The silicone-based adhesive protective film according to claim 1, wherein the silicone resin comprises a mixture of the first silicone resin and the second silicone resin,
the first silicone resin and the second silicone resin being present in a ratio in parts by weight of about 30:70 to about 70:30 relative to 100 parts by weight of the mixture.

5. The silicone-based adhesive protective film according to claim 1, wherein the first silicone resin is $((Me)_3SiO_{1/2})_{4-p}((Me)_2SiO)_m(SiO_{4/2})(Vi(Me)_2SiO_{1/2})_p$, where Me is a methyl group, Vi is a vinyl group, and m and p are as defined in Formula 1.

6. The silicone-based adhesive protective film according to claim 1, wherein the second silicone resin comprises at least one selected from the group consisting of $((Me)_3SiO_{1/2})_2((Me)_2SiO)_m(HeMeSiO)_n$ and $(Vi(Me)_2SiO_{1/2})_2((Me)_2SiO)_m(HeMeSiO)_n$, where Me is a methyl group, He is a hexenyl group, and m and n are as defined in Formula 2.

7. The silicone-based adhesive protective film according to claim 1, wherein the composition for silicone-based adhesive protective films further comprises an anchoring agent.

8. The silicone-based adhesive protective film according to claim 1, wherein the silicone resin composed of $R^3R^4{}_2SiO_{1/2}$ and $SiO_{4/2}$ units comprises an MQ silicone resin comprising $Me_3SiO_{1/2}$ and $SiO_{4/2}$ units.

9. An optical member comprising:
an optical film; and
a silicone-based adhesive protective film formed on a surface of the optical film, the silicone-based adhesive protective film being the silicone-based adhesive protective film according to claim 1.

* * * * *